Dec. 20, 1966  S. MUSICAN  3,292,529
DEVICE FOR MARKING A PLURALITY OF PLIES OF MATERIAL
Filed Oct. 20, 1965  3 Sheets-Sheet 1
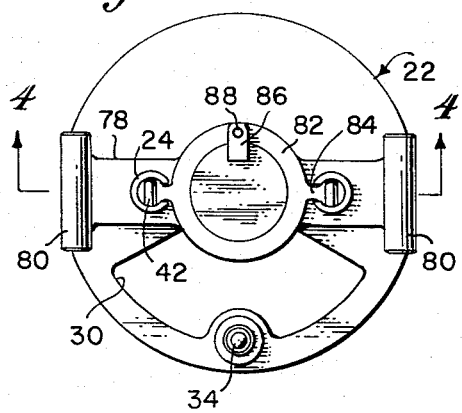
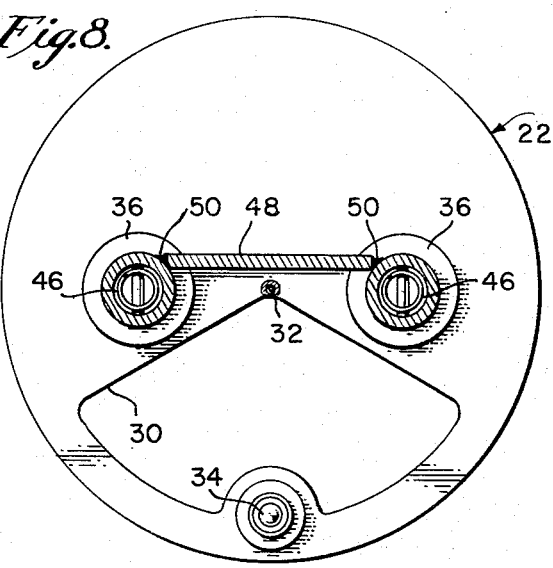
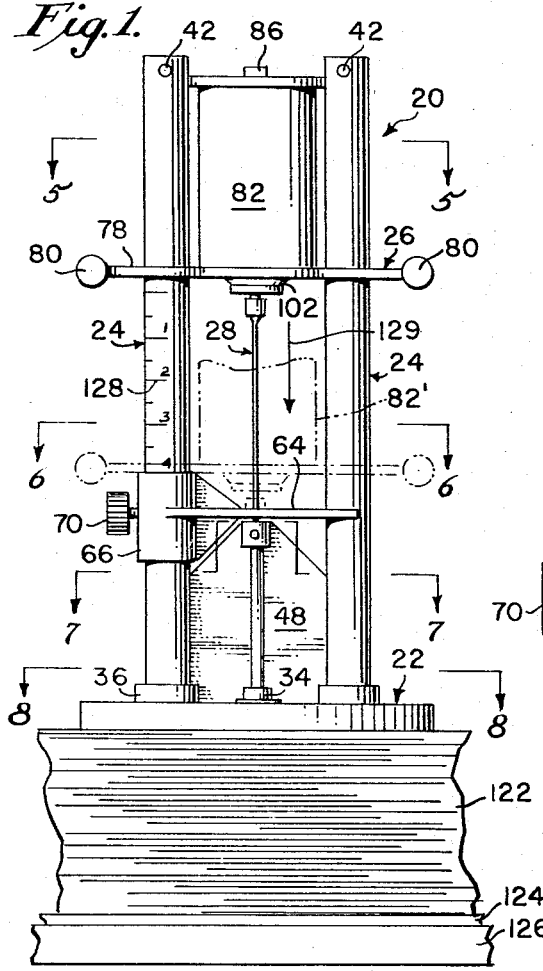
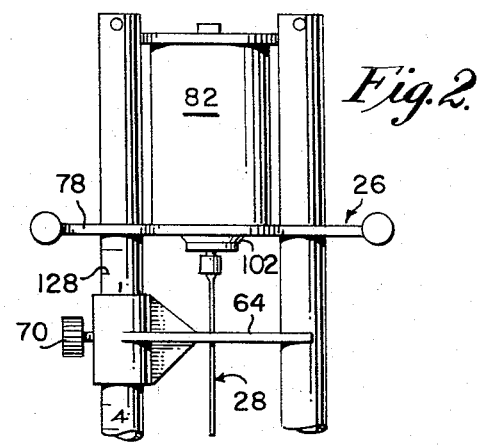
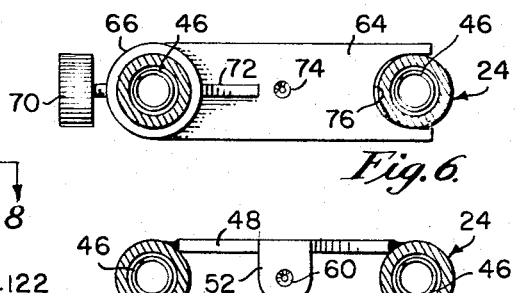
INVENTOR.
SOLOMON MUSICAN
BY
Caesar, Rivise,
Bernstein and Cohen
ATTORNEYS.

Dec. 20, 1966     S. MUSICAN     3,292,529
DEVICE FOR MARKING A PLURALITY OF PLIES OF MATERIAL
Filed Oct. 20, 1965     3 Sheets-Sheet 2
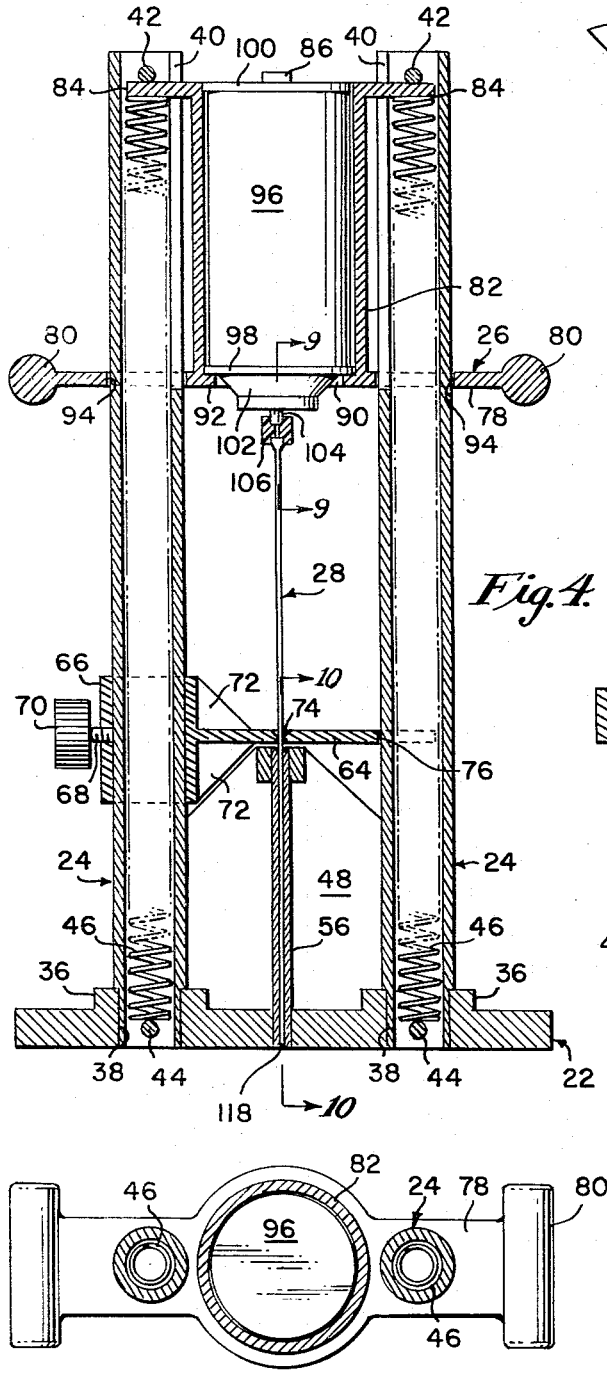
Fig. 4.
Fig. 5.
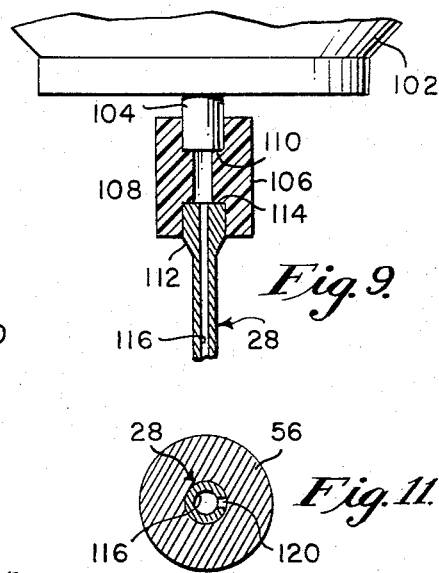
Fig. 9.
Fig. 11.
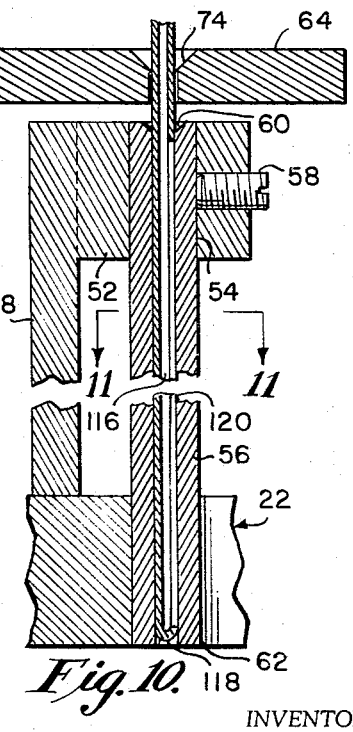
Fig. 10.
INVENTOR.
SOLOMON MUSICAN
BY
Caesar, Rivise,
Bernstein and Cohen
ATTORNEYS.

Dec. 20, 1966  S. MUSICAN  3,292,529
DEVICE FOR MARKING A PLURALITY OF PLIES OF MATERIAL
Filed Oct. 20, 1965  3 Sheets-Sheet 3

INVENTOR.
SOLOMON MUSICAN
BY
Caesar, Rivise,
Bernstein and Cohen
ATTORNEYS.

United States Patent Office 3,292,529
Patented Dec. 20, 1966

3,292,529
DEVICE FOR MARKING A PLURALITY
OF PLIES OF MATERIAL
Solomon Musican, Philadelphia, Pa., assignor to Hol-Mark Machine Corporation, Philadelphia, Pa., a corporation of Pennsylvania
Filed Oct. 20, 1965, Ser. No. 498,605
10 Claims. (Cl. 101—26)

This invention relates to a device for marking a plurality of plies of material, and more particularly, a new and improved device used for marking fabric which will ultimately be used in the making of garments.

In the garment industry, fabric is assembled in many layers and in one cutting a manufacturer cuts a number of identical sections according to a pre-determined pattern. It is necessary to mark each of these sections in order to conform them to the pattern and to indicate where certain details of the final garment will be located. Thus, such details as buttons, button holes and pleats must be marked on each of the sections which was cut to the given pattern.

In the past many devices have been used which had as their purpose the simultaneous marking of each section or ply in a plurality of plies. One of the first used methods for marking a plurality of sections was to physically drill a hole through all of the sections or plies cut to a given pattern. However, the drilling suffered from a number of disadvantages. One of the primary disadvantages was that after the hole was cut it was necessary for the tailor to hold each ply up to the light to determine where the hole was drilled. This was obviously a time-consuming job and severely cut down the efficiency of the operation. Furthermore, in loosely knit materials, drilling was totally ineffective since no permanent hole was left.

An improvement on this method was arrived at by using a drill having cutting teeth at its tip. Thus the hole could be made wider than that which was accomplished by the previous drills. It has been found, however, that although this method was satisfactory for woven fabrics it could not be used on knit fabrics in view of the fact that the cutting would break the knit strands and could ultimately damage the knit fabric. Furthermore, on bulky knit fabrics it was still very difficult to find the location of the drilled hole.

Another method used in the prior art consisted of passing a needle through a plurality of plies of the cut sections. This needle would have a central bore and an opening at its lower tip. In use, chalk powder would be blown through the needle and out the tip, and this powder would leave a mark on the fabric. This method suffered from the disadvantage that it was inexact in that there was no certainty that each ply would be contacted by the powder as the needle was either pushed down or withdrawn. Furthermore, the loose powder could be brushed away inadvertently and therefore the mark could not be found when it was necessary to carry out further tailoring operations such as the placement of buttons, button holes and pleats.

The device of this invention overcomes all of the difficulties of the prior art methods. There is no necessity for having a motor with the device of this invention since there is no drilling. Thus there is a savings in cost alone.

Furthermore, the device of this invention utilizes a chalk suspension which includes a liquid carrier. The small amount of liquid in combination with the chalk powder prevents the inadvertent removal of the mark when each of the plies is subsequently tailored.

It is therefore an object of this invention to provide a novel device for marking a plurality of plies of material.

It is a further object of this invention to provide a device for marking a plurality of plies of knit material.

It is a further object of this invention to provide a device for marking a plurality of plies of material that does not require the prior art drills.

It is a further object of this invention to provide a device for marking a plurality of plies of material which is extremely accurate in use.

These and other objects of this invention are accomplished by providing a device for marking a plurality of plies of material comprising a support, means supporting an aerosol can be associated with said support, said aerosol can supporting means being longitudinally movable with respect to said support, and a needle associated with the discharge valve of said aerosol can, said needle having a central bore and an elongated slot extending along a substantial length of the outer surface of said needle, said slot being in connection with said bore.

Other objects and many of the attendant advantages of this invention will be readily appreciated as the same becomes better understood by reference to the following detailed description when considered in connection with the accompanying drawings wherein:

FIG. 1 is a front elevational view of the device of this invention shown on a plurality of plies of material;

FIG. 2 is a front elevational view showing a second position for the valve release of the device of this invention;

FIG. 3 is a top plan view of the device of this invention;

FIG. 4 is an enlarged sectional view taken along the line 4—4 of FIG. 3;

FIG. 5 is an enlarged sectional view taken along the line 5—5 of FIG. 1;

FIG. 6 is an enlarged sectional view taken along the line 6—6 in FIG. 1;

FIG. 7 is an enlarged sectional view taken along the line 7—7 of FIG. 1;

FIG. 8 is an enlarged sectional view taken along the line 8—8 of FIG. 1;

FIG. 9 is an enlarged sectional view taken along the line 9—9 of FIG. 4;

FIG. 10 is an enlarged sectional view taken along the line 10—10 of FIG. 4;

FIG. 11 is an enlarged sectional view taken along the line 11—11 of FIG. 10;

Figure 12:
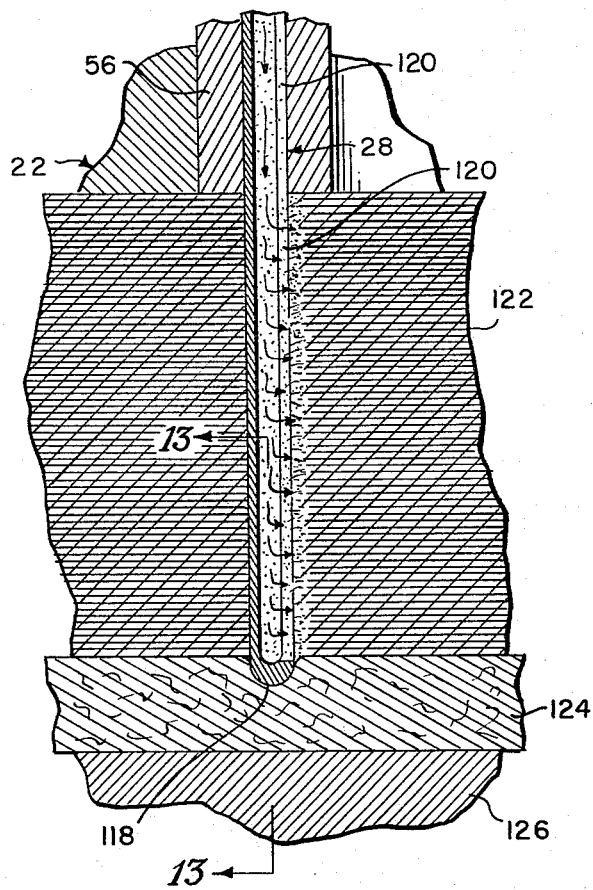
FIG. 12 is a sectional view showing the needle of this invention within the plies of material.

Referring now in greater detail to the various figures of the drawings wherein similar reference characters refer to similar parts, a device for marking a plurality of plies of material is generally shown at 20 in FIG. 1. Device 20 basically comprises a base 22, a pair of supporting shafts 24 mounted on base 22, an aerosol can holder 26 slidably mounted on shafts 24 and a needle 28 connected to the valve of an aerosol can.

As best seen in FIGS. 4 and 8, base 22 basically comprises a circular plate and includes an opening 30 which passes therethrough. Opening 30 is basically the shape of an opened V and includes a vertex 32 at the midpoint of the plate. A spirit level 34 is positioned along the outer perimeter of base 22 and is aligned with the vertex 32 of opening 30. A pair of integral upstanding bosses 36 flank a pair of aligned holes 38 in the base. As seen in FIG. 8, bosses 36 have their centers on a diameter of base 22 and are positioned on opposite sides of vertex 32.

Shafts 24 are mounted in base 22 by a pressed fit within bosses 36. If desired, shafts 24 can be additionally secured in place by welding. As seen in FIG. 4, each shaft 24 includes a slot 40 which projects downwardly from the top of the shaft and extends for approximately one-third the length of the shaft. Slots 40 pass entirely through the wall of each shaft and face each other. A pin 42 extends across each shaft 24 adjacent the top thereof. Pins 42 are secured in place by passing into the wall of each shaft. A second pin 44 is secured to each shaft 24 in a similar manner adjacent the bottom of each shaft. A compression coil spring 46 is positioned in each shaft and is adapted to extend from pins 42 to pin 44.

A vertical plate 48 bridges the shafts 24 and is secured to both shafts as by welding 50 (FIG. 8). As seen in FIG. 1, plate 48 extends up through approximately one-third the height of shafts 24 and is secured adjacent the bottom of these shafts. Plate 48 includes an integral boss 52 projecting perpendicularly outward from its top. As best seen in FIG. 10, boss 52 is provided with a central opening 54 which passes vertically therethrough. A hollow tube 56 is mounted in opening 54. Tube 56 is secured to boss 52 by a set screw 58 (FIG. 10). The top of tube 56 is provided with a bevelled entrance 60 adjacent its bore. The bottom of tube 56 is secured in an opening 62 in base 22. The lower edge of tube 56 terminates in the same plane as the bottom of base 22.

A horizontal plate 64 is adjustably mounted on one of the shafts 24. As seen in FIG. 4, plate 64 projects from an integral collar 66. Collar 66 includes a threaded hole 68 passing therethrough. A thumb screw 70 is threadedly secured in hole 68. A pair of vertical reinforcing plates 72 join collar 66 and plate 64. Plates 72 can either be integrally formed with the collar 66 and plate 64 or may be welded thereto. A hole 74 having a bevelled upper entrance passes through plate 64. As best seen in FIG. 10, hole 74 is aligned with the bore of tube 56. As seen in FIG. 6, plate 64 includes an arcuate recess 76 on the side opposite collar 66. The wall of recess 76 slidably engages a shaft 24.

Aerosol can holder 26 includes a rectangular lower plate 78 (FIG. 3). An integral rod 80 is formed on each end of plate 78 and extends perpendicularly thereto. As seen in FIG. 4, an integral hollow cylindrical member 82 extends upwardly from the center of plate 78. A pair of opposed integral flanges 84 extend outwardly from the top of cylindrical member 82. As best seen in FIGS. 3 and 4, flanges 84 pass through slots 40 and are positioned between the tops of springs 46 and the bottoms of pins 42. A short bar 86 is pivotally mounted on the top of cylindrical member 82 by pin 88 (FIG. 3).

Plate 78 is provided with a circular central opening 90 which is slightly smaller in diameter than the internal diameter of cylindrical member 82. Thus an annular shoulder 92 is formed adjacent opening 90. Plate 78 is also provided with a pair of aligned openings 94 which telescopically receive shafts 24.

An aerosol can 96 (FIG. 4) is mounted within cylindrical member 82 in an inverted position. In order to insert the can, bar 86 is pivoted at least 90° from the position shown in FIG. 3. Thereafter, the can is dropped in place and bar 86 is returned to the position shown. Can 96 includes an upper rim 98 which rests on shoulder 92. Bar 86 will rest against the lower rim 100 of the can. The top 102 of can 96 is tapered and passes through opening 90. A short tube 104 projects from the top of the can and includes an opening in its top. Tube 104 will actuate a spring valve on the can when it is depressed. At this time the ingredients of the can will be discharged.

Can 96 contains a suspension of finely ground marking material such as chalk. The specific ingredients of the suspension are disclosed in detail in copending application Serial No. 497,436, filed October 18, 1965. Basically, the suspension comprises a marking material, such as finely powdered chalk, a lubricant, dispersing or suspending agent, and an aerosol propellant.

An adaptor 106 having a hollow bore 108 (FIG. 9) is secured on tube 104 by a pressed fit. Adaptor 106 is made of a resilient material which will frictionally engage tube 104. Any of the moldable plastics can be used for this purpose, such as nylon. As seen in FIG. 9, tube 104 abuts a rim 110 in bore 108. Needle 28 which has an enlarged top 112 is also secured in adaptor 106. The top of needle 28 abuts rim 114 in bore 108. As seen in FIG. 9, bore 116 of needle 28 is aligned with the bore of adaptor 106.

Needle 28 extends from adaptor 106 through opening 74 in plate 64 and into tube 56, as best seen in FIG. 4. With the can holder 26 in its uppermost position, as seen in FIG. 4, the lower tip 118 of needle 28 is adjacent the bottom of tube 56. As seen in FIG. 10, needle 28 includes a slot 120 in its outer wall. Slot 120 is in communication with bore 116. The slot 120 extends upwardly from the lower end of needle 28 through approximately one-half the total height of the needle. With the aerosol can in its uppermost position, the top of slot 120 is positioned just below the top of the bore of tube 56.

The device of this invention is adapted for use with a plurality of plies 122 of fabric (FIG. 1). Each ply comprises a piece of fabric which has been pre-cut according to a pre-determined pattern. The plies 122 are placed on a sheet of pierceable material 124 which may be cardboard or a rigid foam material. The pierceable material is in turn placed on any horizontal surface such as table top 126.

The device of this invention is used by placing it on the plies 122 in the manner shown in FIG. 1. With the device in place, the total height of the plies is then measured. One of the shafts 24 is calibrated as shown at 128 to indicate the range of thickness as of plies 122. Thereafter the height of plate 64 is adjusted by first loosening thumb screw 78. With the thumb screw loosened, collar 66 is slid up shaft 24 until the top of the collar is at a calibration mark which is equivalent to the thickness of the plies. With the top of the collar in place, thumb screw 78 is tightened until it engages shaft 24 (FIG. 4). Plate 64 is then secured in place.

Once the necessary adjustments have been made, the device is used by grasping rods 80, which serve as handles, and pushing them downward in the direction of arrow 129 in FIG. 1. This causes can 96 and needle 28 to move longitudinally downward. The longitudinal movement for the can is maintained by the sliding contact of the walls of openings 94 in plate 78 on shafts 24 and the sliding contact of flanges 84 in slots 40. In addition to the foregoing, the longitudinal movement of needle 28 is maintained by tube 56.

The downward movement of the needle and can are continued until the bottom edge of adaptor 106 contacts the top surface of plate 64. Further continued pressure against the adaptor will cause the depression of tube 104 thereby opening the spring actuated valve in aerosol can 96. It should be noted that upward movement of can 96 is prevented by rod 86. When the valve is opened, a small amount of chalk suspension is propelled from the top of tube 104, through bore 108 in adaptor 106 and into the bore 116 of needle 28. The path of the chalk suspension is shown by the arrows in FIG. 12. Thus, the propelled suspension follows the path of least resistance and thus is expelled through the slot 120 in needle 28. No chalk suspension will pass through the slotted portion of the needle which is not embedded in the plies of fabric. Thus, any portion of the slot which is not in the fabric will be positioned within tube 56. Since the tube is impervious, none of the chalk suspension will leave through that portion of the slot within the tube. It is thus seen that the tube serves the dual function of preventing an inadvertent expulsion of chalk suspension and of maintaining the longitudinal movement of the needle when the device is used. The position of the cylinder holding the aerosol can when the device is being operated is shown in phantom at 82' in FIG. 1.

Figure 13:
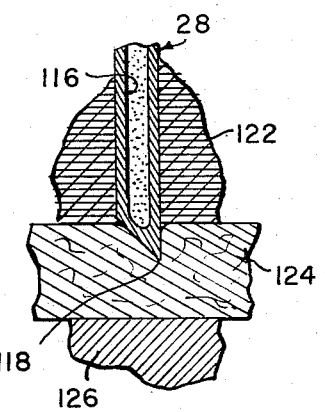
FIG. 13 is an enlarged sectional view taken along the line 13—13 of FIG. 12.

The shaft 24 is calibrated to the extent that the tip of needle 28 will just penetrate the resilient material 124 when the valve in the aerosol can is opened. This is seen in FIG. 13. At this position, the slot will be adjacent the lowermost ply of fabric 122 and thus each and every ply will be simultaneously marked with chalk suspension emanating from slot 120. Only a short blast of suspension is necessary for completely marking all of the plies. Additionally, the mark on each ply will be of uniform size when using the device of this invention and it is necessary to have only one expulsion of chalk suspension from the aerosol can for each marking operation for all of the plies.

After the plies have been marked, the pressure is removed from handles 80. Plate 78 and its associated aerosol can are immediately returned to the position shown in FIGS. 1 and 4 by the action of springs 46. As soon as the pressure is removed from handles 80 and the aerosol can is returned to its upward position, the spring valve in the aerosol can will be closed. This is because there is no longer any pressure by adaptor 106 against tube 104. If additional marks are to be made on the same group of plies of fabric, it is merely necessary to move the device to a new position.

The purpose of opening 30 is to aid in positioning the device on the plies of fabric. Thus the specific position for a mark is indicated on the upper surface of the top ply and the device is positioned in order to have the mark at the vertex 32 of the opening. The device is held in a horizontal position which is readily determinable by using spirit level 34.

When a new group of plies is to be marked, the thickness is again measured in the manner described above. Thereafter, the height of plate 64 is re-set in accordance with the new measurement. The calibration on one of the shafts 24 will always insure that the aerosol can will be discharged at a point wherein the tip of the needle penetrates pierceable board 124 while at the same time each and every ply will be in communication with slot 120, thereby insuring the necessary mark on each ply.

Figure 14:
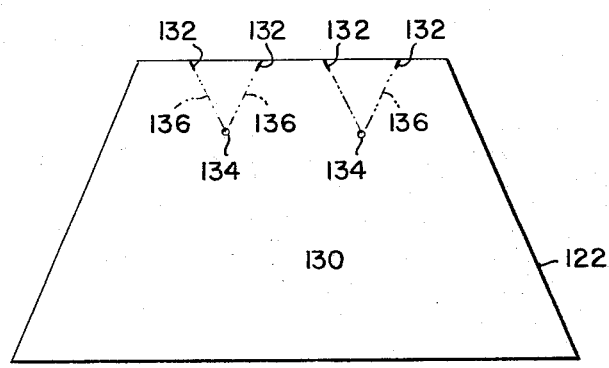
FIG. 14 is a plan view of a ply of material which has been marked with the device of this invention.

An example of a ply 122 which can be used in this invention is shown in skirt pattern 130 in FIG. 14. This pattern is used for a two pattern skirt. In cutting the pattern, four slits 132 are made in the top edge of the pattern. These slits are indicating lines for forming pleats. The device of this invention will be used to form marks 134 which will be positioned at the vertex of imaginary lines 136 drawn through slits 132.

In use, pattern 130 will be formed with two pleats by folding the fabric over and placing one slit 132 on top of its next adjacent slit 132. A line of stitching will then be formed along the overlapping imaginary lines 136, which stitching will terminate at mark 134. The mark can easily be brushed away during the stitching operation thereby removing all traces of the mark.

In addition to the foregoing function of aiding in locating pleats in the pattern, the device of this invention can be similarly used for locating buttons and button holes in a pattern. Since the mark produced is propelled out of the aerosol can by use of a dispersant, the dispersant will aid in retaining the chalk mark in place until it is intentionally removed. This is a distinct advantage over using pure powder chalk which can be inadvertently brushed away or difficult to locate. Furthermore, having the dispersant in combination with the chalk results in a more distinctly defined point.

Whenever the material within aerosol can 96 is used up, it is a relatively simple matter to remove the can from cylinder 82. Thus, bar 86 is pivoted 90° from the position shown in FIG. 3, can 96 is lifted out, and the connection between tube 104 and adaptor 106 is broken by pulling the tube upward. A new can is then inserted and its tube 104 is pushed into the bore of adaptor 106. Again, since the adaptor comprises a resilient plastic material, it will frictionally engage the tube 104. Latch 86 is pivoted back to the position shown in FIG. 3, and the device will then again be ready for use.

Obviously many modifications and variations of the present invention are possible in the light of the above teachings. It is, therefore, to be understood that within the scope of the appended claims, the invention may be practiced otherwise than as specifically described.

What is claimed as the invention is:

1. A device for marking a plurality of plies of material comprising a support, means releasably securing and supporting an aerosol can containing marking material associated with said support, said aerosol can being supported in a vertical inverted position and having a discharge valve therein which is lowermost when said can is in said vertical position, said aerosol can supporting means and said aerosol can associated therewith being vertically movable with respect to said support, a needle associated with the discharge valve of said aerosol can and positioned vertically below said valve, said needle having a central bore and an elongated slot extending along a substantial length of its outer surface, said slot being in communication with said bore, and means for automatically opening said discharge valve when said aerosol can is moved vertically downward, said means for opening said discharge valve comprising a plate, whereby pressure of said valve against said plate opens said valve.

2. The device of claim 1 wherein said support comprises a base and a pair of shafts projecting vertically upward from said base.

3. The device of claim 2 and further including spring means associated with said shafts, said spring means urging said aerosol can supporting means.

4. The device of claim 3 wherein said shafts are hollow and said spring means are positioned within said shafts.

5. A device for marking a plurality of plies of material comprising a support, means releasably securing and supporting an aerosol can containing marking material associated with said support, said aerosol can being supported in a vertical inverted position and having a discharge valve therein which is lowermost when said can is in said vertical position, said aerosol can supporting means and said aerosol can associated therewith being vertically movable with respect to said support, a needle associated with the discharge valve of said aerosol can and positioned vertically below said valve, said needle having a central bore and an elongated slot extending along a substantial length of its outer surface, said slot being in communication with said bore, and means for automatically opening said discharge valve when said aerosol can is moved vertically downward, with said discharge valve opening means being adjustable and additionally serving to limit the downward vertical movement of said needle.

6. The device of claim 5 wherein said support includes at least one vertical shaft, and said means for opening said valve comprises a plate which is vertically adjustable on said shaft, said plate having a hole passing therethrough with said needle passing through said hole.

7. The device of claim 6 and further including an adaptor having a hollow bore, said adaptor having one end secured on the top of said needle and the other end frictionally engaging actuating means for said valve, whereby the forcing of said adaptor against said plate will force the opening of said valve.

8. A device for marking a plurality of plies of material comprising a support, means releasably securing and supporting an aerosol can containing marking material associated with said support, said aerosol can being supported in a vertical inverted position and having a discharge valve therein which is lowermost when said can is in said vertical position, said aerosol can supporting means and said aerosol can associated therewith being vertically movable with respect to said support, a needle associated with the discharge valve of said aerosol can and positioned vertically below said valve, said needle having a central bore and an elongated slot extending along a substantial length of its outer surface, said slot being in communication with said bore, said support comprising a base, and a hollow tube projecting vertically upward from said base, with said hollow tube adapted to have its lower end contact said plies of material when said device is used on the plies of material, said needle having a portion thereof positioned within said hollow tube during use of the device on said plies, said needle being longitudinally movable within said hollow tube and out of the end adjacent said base, and means for automatically opening said discharge valve when said aerosol is moved vertically downward.

9. The device of claim 8 wherein the slot in said needle is at least as long as the total height of the plies of material to be marked, whereby that portion of the slot remaining when a smaller number of plies are to be marked will be positioned within said tube.

10. The device of claim 8 wherein said base has an opening passing therethrough, with said hollow tube being positioned adjacent said opening, whereby said hollow tube can be placed over an indicated position on the top ply of the plies of material to be marked by sighting through said opening.

References Cited by the Examiner
UNITED STATES PATENTS

| | | | |
|---|---|---|---|
| 2,118,718 | 5/1938 | White et al. | 101—26 |
| 2,135,228 | 11/1938 | Wolkan | 101—26 |
| 2,227,254 | 12/1940 | Glassberg et al. | 101—26 |
| 2,681,003 | 6/1954 | Rossi et al. | 101—26 |
| 3,098,430 | 7/1963 | Ruthen et al. | 101—26 |

ROBERT E. PULFREY, *Primary Examiner.*

W. F. McCARTHY, *Assistant Examiner.*